Dec. 20, 1966   L. W. GARDENHIRE ET AL   3,293,633
DIGITAL TRANSDUCER
Filed Sept. 18, 1962   2 Sheets-Sheet 1

INVENTORS
LAWRENCE W. GARDENHIRE
& GEORGE BIRKEL, JR.
BY Hurvitz & Rose
ATTORNEYS Dec. 20, 1966  L. W. GARDENHIRE ET AL  3,293,633
DIGITAL TRANSDUCER
Filed Sept. 18, 1962  2 Sheets-Sheet 2

INVENTORS
LAWRENCE W. GARDENHIRE
& GEORGE BIRKEL, JR.
BY Hurvitz & Rose
ATTORNEYS

United States Patent Office 3,293,633
Patented Dec. 20, 1966

3,293,633
DIGITAL TRANSDUCER
Lawrence W. Gardenhire and George Birkel, Jr., Eau Gallie, Fla., assignors to Radiation Incorporated, a corporation of Florida
Filed Sept. 18, 1962, Ser. No. 224,384
13 Claims. (Cl. 340—347)

The present invention relates generally to digital transducers and more particularly to a digital transducer employing an erasable magnetic medium from which magnetic flux levels are directly read.

It has been the practice in fields in which displacement is utilized to provide an indication of a particular phenomena being measured to convert relative movement between a stationary member and a transducer to an analog quantity indicative of this displacement. The analog quantity usually is in the form of a variable voltage or an amplitude or frequency modulated carrier wave.

Where the information derived from a displacement measuring transducer is employed in a system utilizing digital processing techniques, such as air borne telemetering equipment, the analog output quantity from the transducer is incompatible with the digital processing equipment and analog to digital converters must be utilized. Due to the stability and accuracy which must be employed in such converters, they are generally of relatively large size and heavy weight and in consequence are not suitable for airborne operations where weight and space are at a premium.

In the past, the usual practice has been to locate the converter at a ground station and transmit multiplexed analog information to the ground station for conversion. Multiplexing of analog information, its recording at a ground station and separation from other information introduces appreciable errors into the system and the accumulated error from the various sorting operations frequently exceeds the individual errors in measuring a conversion.

In accordance with the present invention, the necessity for analog to digital converters is obviated by employing a displacement digital converter directly at the transducer site. The transducer includes a computer type memory record which stores parallel tracks of digitized data on a magnetic medium. The medium is precoded in accordance with known displacements which the quantity being measured produces between the record and its readout mechanism. This is accomplished by pre-recording on the magnetic medium flux levels corresponding with binary zero and one values which indicate the relative positions of the record to the flux sensing heads in the read-out mechanism.

To provide an indication of the actual flux value being read, and not merely of the rate of change thereof, each of the sensing heads includes flux responsive means, such as a Hall plate. In response to the flux induced in the read-out head by the digitized values stored, the Hall plate generates a voltage having a positive or negative value. The digitized value in each channel is read out by a separate Hall plate to derive a multi-bit binary signal indicative of the phenomena being measured.

To read-in binary information to the erasable medium for initial precoding or calibration purposes, the identical heads as those employed for readout are utilized. The heads are provided with input windings which are responsive to voltages representing binary signals derived in accordance with an output from a calibration standard. Thereby, magnetic flux levels are pre-recorded on the erasable magnetic record so that record displacements are correlated to the quantity being measured in engineering units.

By utilizing an erasable recording medium, it is possible to accurately calibrate each of the transducers with a minimum of cost. This is because there is no need to measure the response of each transducer individually and thereafter fabricate a special non-linear readout mechanism for it. Also, utilization of an erasable, easily changed magnetic recording medium enables the same transducer assembly to be utilized for sensing varying ranges of the quantity transduced. This is effected by appropriately changing the sensing element and the code stored on the magnetic record.

By sensing the magnitude and polarity of flux being read, rather than the flux rate of change, the need for counting units to indicate the relative positions of the sensing and record carrying members is obviated. This is because instantaneous indications are always obtained of the actual flux levels being read by sensing the binary voltages being read from the plural Hall generators.

In accordance with one embodiment of the present invention, errors due to non-linearities in displacement versus the measured quantity are obviated by non-uniformly packing the binary information on the magnetic storage medium. Read-in of non-uniform density information is accomplished by coupling variable level signals to the read-in mechanism during calibration in accordance with the desired non-linear function. Thereby, the lengths of the magnetic flux bits in each channel along the longitudinal axis of the record are not necessarily integral multiples of each other. For linear and certain non-linear functions, the voltages applied to each read-in head are always equal to one of two values so that all of the bit lengths of magnetic flux are integral multiples of each other.

It is, accordingly, an object of the present invention to provide a new and improved means for converting physical motion into a digital word without the necessity for conversion to an analog signal.

Another object of the present invention is to provide a new and improved digital transducer system utilizing an erasable magnetic look-up table into which calibration signals are written by utilizing conventional magnetic heads.

A further object of the present invention is to provide a system in which information indicative of the position of a transducer relative to a read-out mechanism is obtained by sensing flux levels indicative of binary zeros and ones.

An additional object of the present invention is to provide a digital transducer in which stored information indicative of the physical variable being sensed may be changed at will so calibrating and editing functions can be performed to permit recording of the physical quantity directly in engineering scales.

It is still another object of the present invention to provide a digital transducer in which a non-linear function is recorded on a magnetic medium, in which binary informaton is stored on said medium at varying packing densities.

A further object of the present invention is to provide a digital transducer in which dynamic calibration is feasible.

Still an additional object is to provide a digital transducer wherein the resolution of the movable record bearing element depends upon repeatability of its motion in response to the quantity being measured, rather than upon linearity.

The above and still further objects, features and advantages of the present invention will become apparent upon consideration of the following detailed description of one specific embodiment thereof, especially when taken in conjunction with the accompanying drawings, wherein.

Figure 1:
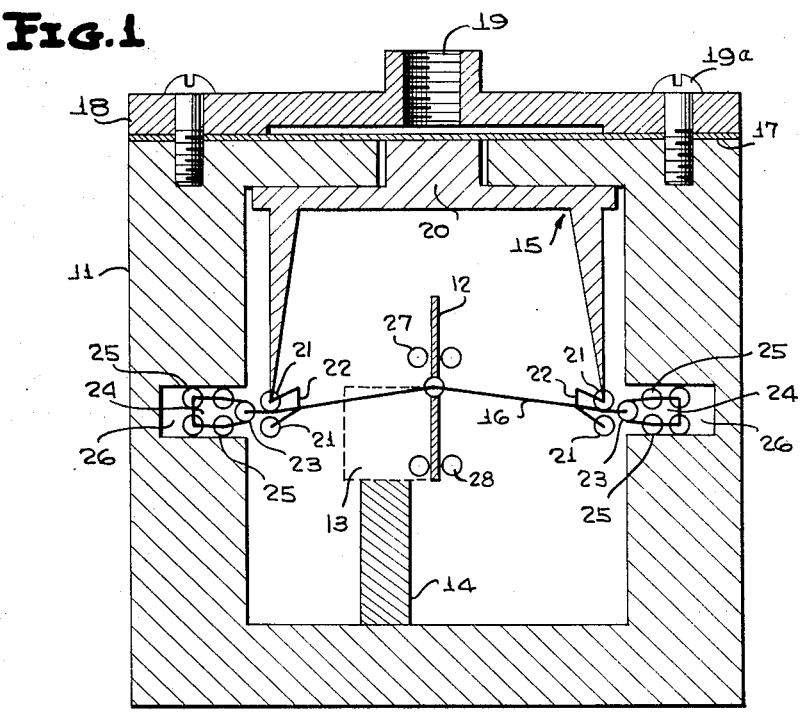
FIGURE 1 is a schematic diagram illustrating the principles of the present invention when employed with a pressure sensitive transducer.

Reference is now made to FIGURE 1 of the drawings, a side sectional view of a pressure transducer according to the present invention, in which a hollow metallic body 11 contains a translatable magnetic recording medium secured to one face of platen 12 and stationary read-in, read-out assembly 13. Read-in, read-out assembly 13 is connected to the base of chamber 11 by standard 14 while recording medium 12 is connected to pressure responsive piston 15 via platen arm 16. Piston 15 is connected at its upper end via boss 20 to diaphragm 17 which is maintained in place by cover plate 18. Cover plate 18 has a cylindrical aperture 19 therein to maintain diaphragm 17 in communication with the medium surrounding chamber 11. In consequence, vertical movement of piston 15 provides an indication of the pressure difference between the interior and exterior of transducer 11. To maintain cover plate 18, body 11 and diaphragm 17 in place, screws 19a fit onto holes provided in the cover plate, diaphragm, and chamber.

To provide amplification of the small movements of diaphragm 17 in response to pressure changes coupled thereto through aperture 19, a mechanical amplifier is provided. This amplifier includes platen arm 16, which is secured at its mid-point to record carrying platen 12, and rollers 21 mounted at the end of each finger of piston 15. Wire platen arm 16 extends between rollers 21 which are compressed together by springs 22 to control the vertical position of wire 16, hence platen 12. Either end of platen arm 16 is fixedly connected to pins 23. Pins 23 ride on carriage assemblies 24 which are horizontally translated in response to vertical movement of piston 15. Each of the carriage assemblies 24 includes four wheels which engage the roof and floor grooves 26 in the interior side walls of chamber 11.

To maintain record carrying platen 12 in the same vertical plane despite movements of platen arms 16, rollers 27 and 28 are provided above and below the connection point between platen 12 and its arm 16. Rollers 27 extend from one wall to the other wall of the pressure chamber in the direction orthogonal to slots 26. One of the rollers 28, however, is segmented due to the interposition of magnetic head assembly 13.

In response to a pressure difference between the faces of diaphragm 17, piston 15 is translated vertically in chamber 11. This results in deflection of platen arm 16 and translation of carriage assemblies 24 relative to the side walls of chamber 11. It has been found that the lever arm motion amplifier attained through platen arm 16 enables a diaphragm motion of 0.03" to be amplified to a platen motion of 0.50". As platen 12 is translated in response to the pressure variations at diaphragm 17, the magnetic record which it is carrying is translated vertically relative to fixed magnetic head assembly 13 to produce varying digital outputs from the magnetic head assembly.

Figure 2:
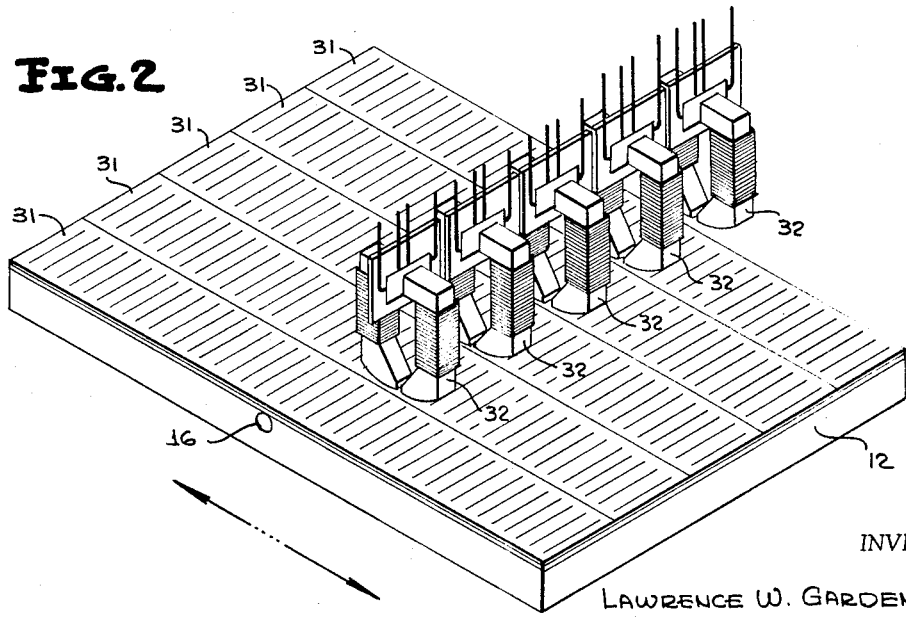
FIGURE 2 is a perspective drawing of the placement of the readout device relative to the recording medium.

Reference is now made to FIGURE 2 of the drawings which discloses a perspective view of the digital read-in, read-out mechanism of the present invention. Upon platen 12 is fixedly mounted a plurality of parallel binary signal storage channels or tracks 31, each of which includes an erasable magnetic material, of the type well known in the recording and computer art. Associated with each of the channels 31 is a separate magnetic read-in, read-out head 32. Each of the heads 32 is positioned directly above its associated bit channel 31 to effect the required read-in of binary zero and one flux states in the bit channels and to read-out the binary zero and one flux states. It has been found that to optimize space requirements and eliminate the effect of gap scatter during recording, i.e., scattering of the flux to other points than between the gap, that the same heads should be utilized for both recording and reading out the information. It is to be understood that the assembly of read-out heads 32 is actually packaged in a single container of embedded epoxy resin, the showing on FIGURE 2 being for the purposes of clarity only.

In the present invention, read-out is accomplished by sensing the actual flux state stored in the record, i.e., by determining whether the flux state is approximately at positive or negative saturation, rather than by sensing time changes in the flux of the recorded medium. This has the advantage that readings may be obtained even when there is no relative motion between data carrying channels 31 and heads 32. Also, reading the values of the flux levels directly produces a unique code for each position which does not require counting increments from a reference position. The coded digital data derived from heads 32 may be in any of the standard codes, e.g., binary and Gray. By utilizing a code on record channels 31 which is identical with that of the data processing device responsive to the transducer, the need for conversion equipment is obviated.

To provide maximum packing density, gap 39 between legs 35 and 36 of each head 32 (FIGURE 3) is disposed orthogonally to the direction of the movement of platen 12. Since gap 39 is extremely narrow, for example on the order of only 4 mils wide, and there is little spreading of the flux between the gap during the initial read-in operation, it is possible to attain packing densities as high as 200 bits per linear inch on channels 31.

Figure 3:
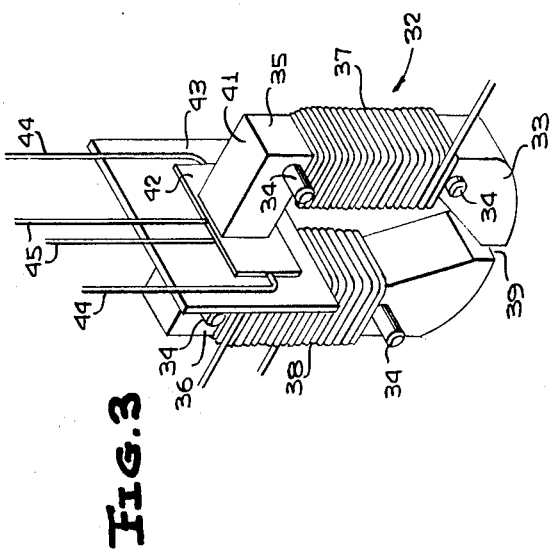
FIGURE 3 is a perspective view of a single readin-readout head utilized with the system of FIGURE 2.

Reference is now made to FIGURE 3 of the drawings which discloses an enlarged perspective view of one of the read, write heads 32. Head 32 includes a plurality of stacked, laminated ferromagnetic, horseshoe shaped elements which are connected together by screws 34. On each of the legs 35 and 36 of head 32, is a separate record winding 37 and 38, respectively. The record windings are selectively connected to a source of positive or negative D.C. current to produce a positive or negative flux saturation on the portion of the recording medium 31, located directly below gap 39 between legs 35 and 36. When it is desired to record a binary one, windings 37 and 38, which are preferably wound with small wire, e.g., #40, is connected to be responsive to a positive D.C. current source to produce a positive flux saturation level in the recording medium, while a negative D.C. current is applied to these windings when a binary zero or negative flux saturation level is recorded.

To read-out the positive and negative flux densities recorded on bit channels 31, a gap having a width on the order of 28 mils is provided in the upper leg 41 between side legs 35 and 36. Within this gap is placed a Hall generator consisting of a rectangular slab of a suitable semiconductor, e.g. indium arsenide. This semiconductor slab is coated with an epoxy covering to form a right parallelepiped having a total thickness of 0.025". To maintain slab 42 in an invariant position relative to leg 41, a ferro-magnetic shim 43 having a total thickness of 3 mils is included in the gap at the top of head 32.

To obtain an electrical voltage commensurate with the flux read at gap 39, a 300 milliampere direct current is applied to leads 44 which are connected to opposite ends of Hall plate 42. This current excites Hall plate 42 so that a relatively large binary output voltage indicative of the flux level and direction within gap 39 is derived from leads 45, which are positioned orthogonally on Hall plate 42 with respect to leads 44. When the bit in channel 31 beneath gap 39 is at a positive flux level, a flux in a first direction is established through Hall plate 42 to provide a positive output voltage between leads 45. If the flux level sensed at gap 39 is negative, the voltage generated between leads 45 is negative, because the flux through plate 42 is in the opposite direction. Thereby, an absolute indication of the flux level read is obtained by sensing the voltage between leads 45 as being positive or negative. This is in contradistinction to the prior systems with which we are familiar where only changes in flux level are sensed.

Figure 4:
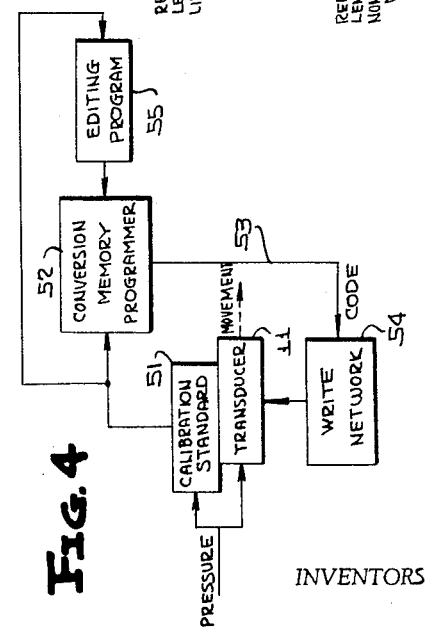
FIGURE 4 is a block diagram illustrating how the transducer of the present invention is interconnected with a memory for calibration purposes.

Reference is now made to FIGURE 4 of the drawings which discloses the manner in which the pressure transducer of FIGURES 1–3 is calibrated. Initially, each of the bit channels 31 has no binary information stored therein, i.e. each of the bit channels is at zero magnetic saturation level. Since the pressure vs. deflection characteristic is different for transducers of various ranges and even between transducers of the same range, it is necessary, in order to provide an accurate indication of the pressure being read, to write the binary equivalent of displacement into each of the bit channels in response to predetermined movement of platen 12.

To read in binary information to channels 31 for calibration, the same static pressure is simultaneously applied to transducer 11 and to calibration standard 51. This pressure results in translation of the calibration standard 51 and of platen 12 in the transducer being calibrated to a fixed point. In response to this translation standard 51 supplies an output signal, which generally is in analog form, to memory programmer 52.

The analog input to memory programmer 52 is converted into a digital word and is coupled via cable 53 to write network 54. In response to the output of programmer, write network 54 generates a plurality of binary output pulses for each position of transducer 11. A separate one of these pulses is applied to read-in windings 37 and 38 of each head 32. Accordingly, in response to each static pressure input to calibration standard 51 and transducer 11, a different code output is produced by memory programmer 52 and a different input is provided for each of the bit channels 31 for the relative positions assumed between information channels 31 and heads 32. Thus, for example, if it is assumed that the interior of chamber 11 is maintained at a pressure of 14.7 lbs. p.s.i. and that a pressure of 15 lbs. p.s.i. on the exterior of the chamber results in a 0.005″ movement of platen 12, the lowest order bit channel has written into it a binary one while each of the other bit channels has written into it a binary zero, i.e. the binary number recorded in channels 31 is 00001. As the pressure increases from 15 to 15.3, platen 12 is moved by another 0.005″ and converter 52 generates an output in accordance with the binary number 00010. This results in a binary one flux level being recorded in the second bit channel and a binary zero level recorded in each of the other bit channels. This operation is continued until each of the bit positions is appropriately loaded. In consequence, a direct digital indication of pressure, in engineering units, is obtained on the magnetic record carried by platen 12. After each of the bit positions on record 31 carried by platen 12 is correctly loaded, transducer 11 is ready to be installed to provide a binary read-out of the data stored in bit channels 31 is response to pressures coupled to platen 12 by diaphragm 17, FIGURE 1.

By the use of an erasable magnetic storage medium, each individual pressure transducer may be readily and relatively inexpensively calibrated. Also, if it is believed the transducer is functioning improperly after it is located in the environment in which it is utilized, it is possible to recalibrate merely by reading in different binary flux levels on the flux channels 31. The read-in technique of the present invention allows the same chamber to be utilized for varying pressure ranges by changing diaphragm 17 and recalibrating the data stored on channels 31. This may be readily accomplished by erasing the previously stored data and writing in new data in accordance with the response of the new diaphragm.

Figure 5A:
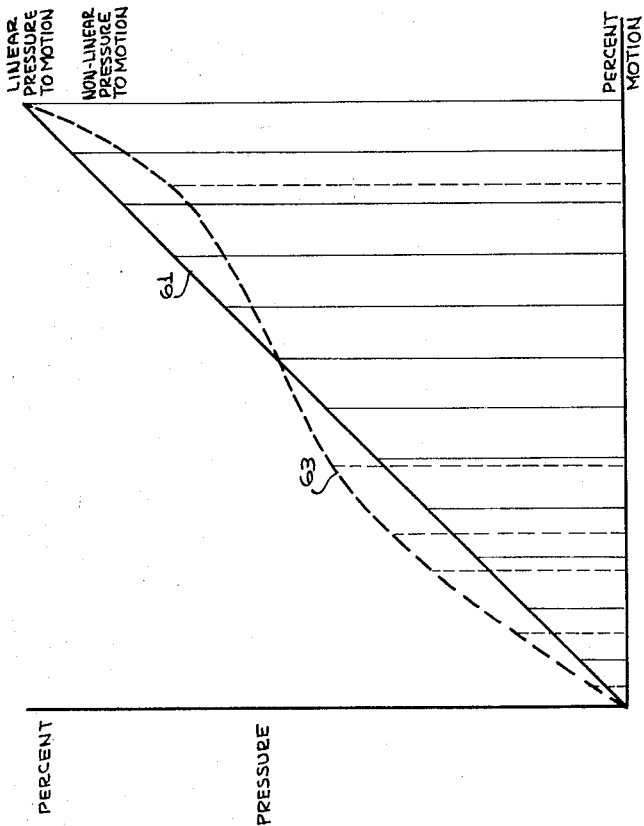
FIGURES 5a, 5b, 5c are graphs illustrating the manner in which data is encoded onto the memory for linear and non-linear motions of the pressure transducer of FIGURE 1.
Figure 5B:
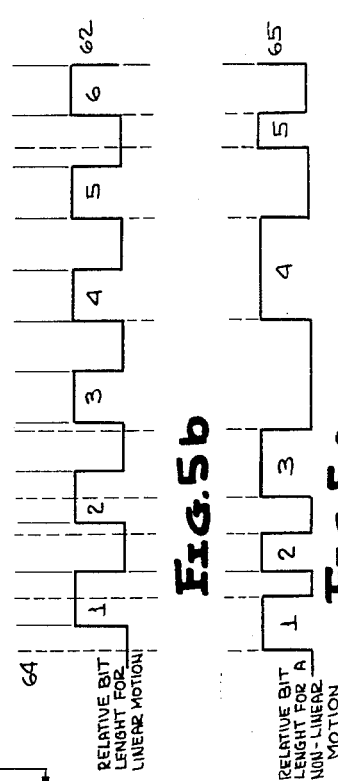
Figure 5C:
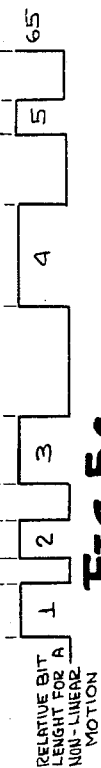

Reference is now made to FIGURE 5 of the drawings which discloses the manner in which flux levels are recorded in accordance with the present invention for both linear and nonlinear translations of platen 12 versus pressure variations. Straight line 61 of FIGURE 5a illustrates the manner in which platen 12 of FIGURE 1 moves in response to pressure variations if it is assumed that the platen motion vs. pressure variation is linear. This results in placement of alternate, equally spaced positive and negative flux levels on the lowest order bit channel 31, as indicated by the square waves 62, FIGURE 5b.

If the motion of platen 12 is non-linear with respect to pressure variations at diaphragm 17, as indicated by curve 63 which approximates a cubic equation, recordation of square wave 62 produces erroneous results, as seen by the projection of vertical dashed lines 64 on wave 62. In consequence, when a non-linear phenomena is being sensed, binary bits are stored on the recording medium as variable length flux levels along each of the bit channels 31, as shown by rectangular wave form 65, FIGURE 5c. To calibrate data channels 31 in a non-linear manner, the amplitude of the voltage supplied to read-in windings 37 and 38 is reduced. This is accomplished by recording variable level signals in editing program 55, FIGURE 4, in accordance with the known non-linear characteristics of standard 51. These signal levels are generated in response to the level of the calibration standard output signal and modulate the amplitude of the binary bits supplied by programmer 52 to read in network 54. We have found that a 3 db reduction in the flux level applied across gap 39 from the maximum results in a binary bit length that is 75% of that attained at complete saturation. Such a reduction in bit length is shown by pulses numbered 2 and 5 in waveform 65. To achieve an elongated flux level, as shown by pulse number 4, it is merely necessary to program converter 52 to derive a binary one output for two adjacent bits in the same channel. By utilization of pulses having non-uniformly related lengths, approximately a three to one improvement of read-out resolution is attained.

While we have described and illustrated one specific embodiment of our invention, it will be clear that variations of the details of construction which are specifically illustrated and described may be resorted to without departing from the true spirit and scope of the invention as defined in the appended claims.

We claim:

1. In a system for measuring the magnitudes of physical phenomena in terms of the motion of a body sensitive to said phenomena, the combination comprising a recording medium; means positioned in proximity to said medium for recording discrete predetermined tabulated values of potential magnitudes of the phenomena to be observed, in the form of a digital code at successive positions along said medium, whereby to calibrate said system for measurements; said means for recording further including means for sensing the digital code recorded at positions along said medium and for converting the sensed values to digital output pulses representative thereof; and means coupling said body to one of said recording medium and said means for recording for movement thereof in predetermined non-linear functional relationship with said motion of said body, to produce relative displacement between said recording medium and said means for recording; each of said recorded positions having a length along said medium commensurate with said predetermined non-linear functional relationship.

2. The combination according to claim 1 wherein said recording medium comprises a magnetic medium having a plurality of recording tracks disposed in parallel relationship thereon extending along the direction of said relative displacement, said recorded positions lying along each track, recorded positions in adjacent tracks being disposed in substantial alignment; said means for recording and sensing comprising a plurality of electromagnetic record-reproduce heads, each positioned in alignment with the other adjacent a respective one of said tracks, each head for sensing the flux level recorded at one of said positions; said digital code impressed on said medium by said heads as a binary flux level at each of said positions, whereby positions aligned in the plurality of tracks transversely to said direction of relative displacement are characterized by a binary word in said code representative of the location of those positions on said medium and of a distinct and different one of said tabulated values.

3. The combination according to claim 2 wherein said body comprises a diaphragm sensitive to relative difference in pressures existing at opposite sides thereof, and wherein said coupling means comprises means for translating said magnetic recording medium relative to said heads in response to motion of said diaphragm.

4. The combination according to claim 3 wherein each of said heads comprises a pair of substantially horseshoe-shaped magnetic cores disposed in confronting relationship to form a pair of relatively narrow gaps, one gap disposed adjacent the respective track and the other gap disposed remotely therefrom, said cores having windings thereon for producing binary flux levels in said gaps for storage on said respective track in response to application of electrical signals representative of said code to said windings, and each head having a Hall measuring plate disposed in the gap remote from said respective track for sensing the flux level produced therein at a recorded position of that track.

5. A system for deriving a coded indication of the position of a body movable in response to an input force, said indication including a series of parallel binary bits, comprising a magnetic record carrier movable in response to movement of said body, the movement of said record carrier in one direction being related by a predetermined function to the force applied to said body, said carrier including a plurality of tracks extending parallel to each other along said one direction, each of said tracks including a series of binary bit indications extending along said direction, said indications of each track alternately having one of only two values, each of said indications being a binary magnetic flux level, a flux level responsive pick up head for each of said channels, each of said pick up heads including means for deriving a voltage indicative of the flux level of its respective channel.

6. The system of claim 5 wherein each of said means for deriving comprises a Hall plate responsive to the flux level of its respective pick up head.

7. The system of claim 5 wherein each of said flux levels is selectively erasable.

8. The system of claim 5 wherein said function is non-linear, and the length of each indication at any point along said direction is inversely related to the rate of change of the movement of said carrier along said direction with respect to the force applied to said body, said rate of change being for the value of the phenomena commensurate with the respective point.

9. The system of claim 5 wherein said predetermined function is linear and the length of each indication along said direction is an integral multiple of the length of the shortest indications in the lowest order channel.

10. The system of claim 5 further including a motion amplifier responsive to the movement of said body for translating said carrier in said direction.

11. The transducer of claim 5 wherein each of said pick-up heads includes means for reading in magnetic flux levels to the storage medium.

12. A system for deriving a coded indication of the position of a body movable in response to an input force, said indication including a series of parallel binary bits, comprising a magnetic record carrier, said carrier including a plurality of tracks extending parallel to each other along one direction, each of said tracks including a series of binary bit indications extending along said direction, said indications of each track alternately having one of only two values, each of said indications being a binary magnetic flux level, a flux level responsive pick up head for each of said channels, each of said pick up heads including means for deriving a voltage indicative of the flux level of its respective channel, and means for moving said magnetic record carrier relative to said pick up heads, the movement of said carrier along said one direction being related by a predetermined function to the force applied to said body.

13. A system for deriving a digital signal indicative of a pressure difference across a flexible diaphragm comprising a plural channel erasable magnetic storage medium for storing digital flux levels indicative of the pressure being measured, a plurality of magnetic flux level responsive read out heads, one of said heads being provided for each of said channels, and means responsive to movement of the diaphragm for translating each of said channels relative to its respective read out head.

References Cited by the Examiner
UNITED STATES PATENTS

| 2,597,866 | 5/1952 | Gridley | 340—347 |
| 2,756,404 | 7/1956 | Anderson et al. | 340—5 |
| 3,171,104 | 2/1965 | Norton et al. | 340—174.1 |
| 3,182,305 | 5/1965 | Wolff | 340—347 |

MAYMARD R. WILBUR, *Primary Examiner.*

ROBERT C. BAILEY, MALCOLM A. MORRISON, *Examiners.*

W. J. ATKINS, A. L. NEWMAN, *Assistant Examiners.*